United States Patent
Pope et al.

(10) Patent No.: US 8,912,480 B2
(45) Date of Patent: Dec. 16, 2014

(54) LIGHT SENSOR SYSTEMS FOR ELECTRONIC DEVICES

(75) Inventors: Benjamin J. Pope, Sunnyvale, CA (US); Kelvin Kwong, Cupertino, CA (US); Richard P. Howarth, San Francisco, CA (US); Richard Hung Minh Dinh, San Jose, CA (US); Tang Yew Tan, Palo Alto, CA (US); Richard Ruh, Monte Sereno, CA (US); Matt Waldon, San Francisco, CA (US); Daniel W. Jarvis, Sunnyvale, CA (US); Brian R. Land, Woodside, CA (US); Steven P. Hotelling, San Jose, CA (US)

(73) Assignee: Apple Inc., Cupertino, CA (US)

( * ) Notice: Subject to any disclaimer, the term of this patent is extended or adjusted under 35 U.S.C. 154(b) by 512 days.

(21) Appl. No.: 13/222,387

(22) Filed: Aug. 31, 2011

(65) Prior Publication Data

US 2013/0048837 A1    Feb. 28, 2013

(51) Int. Cl.
  *G01J 1/02*   (2006.01)
  *H04M 1/02*   (2006.01)
  *G01J 1/42*   (2006.01)
  *G01J 1/04*   (2006.01)

(52) U.S. Cl.
  CPC .............. *G01J 1/0233* (2013.01); *H04M 1/026* (2013.01); *G01J 1/4204* (2013.01); *G01J 1/0474* (2013.01); *H04M 2250/12* (2013.01); *G01J 1/0407* (2013.01); *G01J 1/0425* (2013.01); *G01J 1/0422* (2013.01); *G01J 1/0488* (2013.01)
  USPC ....................................... 250/221

(58) Field of Classification Search
  CPC ................................ H01L 27/144; H04B 7/00
  USPC ................. 250/221, 214.1, 214 R; 455/67.11
  See application file for complete search history.

(56) References Cited

U.S. PATENT DOCUMENTS 4,792,675 A   12/1988   Laughlin
7,236,154 B1   6/2007   Kerr et al.
(Continued)

FOREIGN PATENT DOCUMENTS

EP   0912031   4/1999
EP   2189871   5/2010

OTHER PUBLICATIONS

Kerr et al., U.S. Appl. No. 13/946,534, filed Jul. 19, 2013.
Duncan Kerr, U.S. Appl. No. 12/949,563, filed Nov. 18, 2010.

*Primary Examiner* — Seung C Sohn
(74) *Attorney, Agent, or Firm* — Treyz Law Group; G. Victor Treyz

(57) ABSTRACT

The underside of an inactive portion of a display cover layer in an electronic device may be covered with an opaque masking material. Openings in the opaque masking material may be form ambient light sensor and proximity sensor windows. An ambient light sensor window may be filled with a material that transmits at least some visible light. A proximity sensor window may be filled with a material that transmits more infrared light relative to visible light than the material in the ambient light sensor window. The materials in the ambient light sensor window and proximity sensor window may include one or more layers of ink, patterns of holes, layers of material that are shared with the opaque masking layer, and materials that are black, white, or other colors. A light guide structure may be used to route light received from a sensor window to an associated sensor.

28 Claims, 14 Drawing Sheets

(56) References Cited

U.S. PATENT DOCUMENTS

| | | |
|---|---|---|
| 7,839,379 B1 | 11/2010 | Kerr et al. |
| 7,957,762 B2 | 6/2011 | Herz et al. |
| 7,964,839 B1 | 6/2011 | Langley et al. |
| 2003/0010905 A1 | 1/2003 | Luo |
| 2003/0133284 A1 | 7/2003 | Chipchase et al. |
| 2006/0166702 A1 | 7/2006 | Dietz et al. |
| 2007/0099574 A1* | 5/2007 | Wang .................... 455/67.11 |
| 2008/0158173 A1 | 7/2008 | Hamblin |
| 2008/0165115 A1 | 7/2008 | Herz et al. |
| 2009/0001250 A1 | 1/2009 | Wang |
| 2009/0040703 A1 | 2/2009 | Gotham et al. |
| 2010/0078562 A1 | 4/2010 | Dinh et al. |
| 2010/0207879 A1 | 8/2010 | Fadell et al. |
| 2010/0283394 A1 | 11/2010 | Ong |
| 2010/0327164 A1 | 12/2010 | Costello et al. |

* cited by examiner

LIGHT SENSOR SYSTEMS FOR ELECTRONIC DEVICES

BACKGROUND

This relates generally to sensors and, more particularly, to light sensors for electronic devices.

Electronic devices such as cellular telephones often contain light sensors. For example, a cellular telephone may use an ambient light sensor to measure the amount of ambient light in the environment in which a cellular telephone is operating. When a large amount of ambient light is detected, screen brightness may be increased to help offset the brightness of the environment.

Some cellular telephones contain proximity sensors that can detect when the cellular telephone has been brought into proximity to a user's face. When the cellular telephone comes into close proximity to the user's face, the touch screen in the cellular telephone can be deactivated to avoid unintentional touch input. This type of proximity sensor may contain a light-emitting diode that emits infrared light and a corresponding infrared light sensor that measures the amount of the emitted infrared light that is reflected back to the infrared light sensor from the user's face.

It can be challenging to mount electronic components such as ambient light sensors and proximity sensors in electronic equipment. If care is not taken, sensors such as these will be exposed to view and may be unsightly. Covering the light sensors with cosmetic structures may help enhance device aesthetics, but can potentially interfere with the transmission and reception of light signals associated with the light sensors.

It would therefore be desirable to be able to provide improved light sensors for electronic devices.

SUMMARY

An electronic device may contain a display. The display may be covered with a display cover layer such as a layer of glass. A central active portion of the display may be surrounded by an inactive display region.

The underside of a display cover layer in the inactive region may be covered with an opaque masking material. Openings in the opaque masking material may be form ambient light sensor and proximity sensor windows. An ambient light sensor may be used to measure visible ambient light that passes through the ambient light sensor window. A proximity sensor may contain a light source such as an infrared light-emitting diode and a light detector such as an infrared light detector. The proximity sensor may transmit infrared light through the proximity sensor window using the infrared light-emitting diode and may measure corresponding reflected infrared light that has passed through the proximity sensor window using the infrared light detector.

The ambient light sensor window may be filled with a material that transmits at least some visible light. Light transmission may be limited so that interior device components are not exposed to view through the ambient light sensor window. The proximity sensor window may be filled with a material that transmits more infrared light relative to visible light than the material in the ambient light sensor window.

The materials in the ambient light sensor window and proximity sensor window may include one or more layers of ink, patterns of holes, layers of material that are shared with the opaque masking layer, and materials that are black, white, or other colors. A light guide structure may be used to route light received from a sensor window to an associated sensor.

Further features of the invention, its nature and various advantages will be more apparent from the accompanying drawings and the following detailed description of the preferred embodiments.

DETAILED DESCRIPTION

Figure 1:
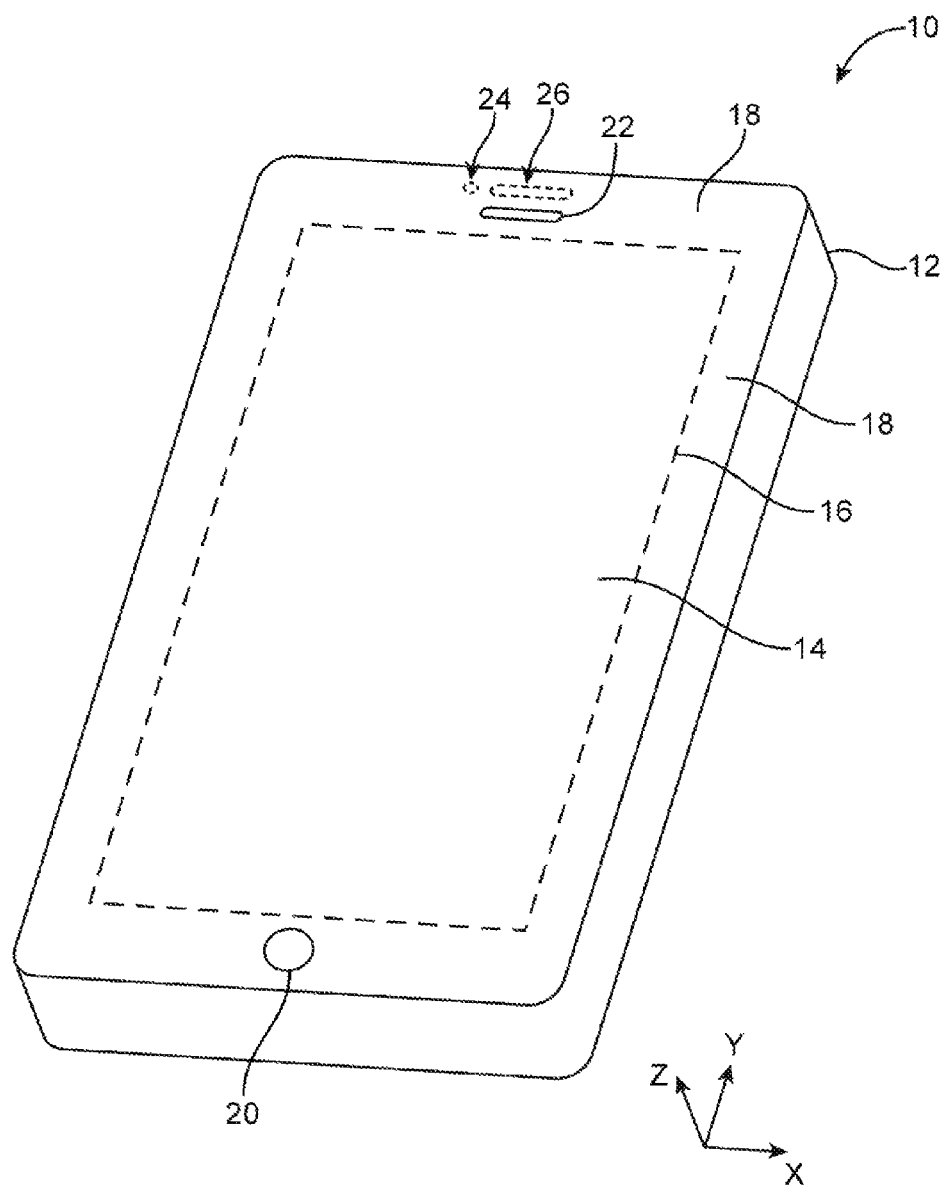
FIG. 1 is a perspective view of an illustrative electronic device with light sensor structures in accordance with an embodiment of the present invention.

Electronic devices such as device 10 of FIG. 1 may be provided with light sensor components. The light sensor components may be used to make ambient light sensor measurements, light-based proximity sensor measurements, or may be used to gather other light sensor data. The light sensor data may be used in controlling the operation of device 10. For example, light sensor data may be used in controlling display brightness, may be used in controlling wireless functions, may be used in controlling touch sensor functions, and may be used in controlling other device functions.

Device 10 of FIG. 1 may be a portable computer, tablet computer, computer monitor, handheld device, game equipment, global positioning system equipment, cellular telephone, or other electronic equipment.

Device 10 may include a housing such as housing 12. Housing 12, which may sometimes be referred to as a case, may be formed of plastic, glass, ceramics, fiber composites, metal (e.g., stainless steel, aluminum, etc.), other suitable materials, or a combination of these materials.

Housing 12 may be formed using a unibody configuration in which some or all of housing 12 is machined or molded as a single structure or may be formed using multiple structures (e.g., an internal frame structure, one or more structures that form exterior housing surfaces, etc.).

In some configurations, housing 12 may be formed using front and rear housing structures that are substantially planar. For example, the rear of device 10 may be formed from a planar housing structure such as a planar glass member, a planar plastic member, a planar metal structure, or other substantially planar structure. As shown in FIG. 1, the front of device 10 may include a planar display such as display 14 that is covered with a planar cover layer. The cover layer that covers the surface of display 14 may be formed from clear glass, clear plastic, or other transparent materials (e.g., materials that are transparent to visible light and that are generally transparent to infrared light). The cover layer that covers display 14 is sometimes referred to as a display cover layer, display cover glass, or display cover layer.

Display 14 may, for example, be a touch screen that incorporates capacitive touch electrodes or a touch sensor formed using other types of touch technology (e.g., resistive touch, acoustic touch, force-sensor-based touch, etc.). Display 14 may include image pixels formed form light-emitting diodes (LEDs), organic LEDs (OLEDs), plasma cells, electronic ink elements, liquid crystal display (LCD) components, or other suitable image pixel structures.

Display 14 and the cover layer on display 14 may have an active region and an inactive region. The active region of display 14 may lie within rectangle 16. Within this region, display pixels such as liquid crystal display pixels or organic light-emitting diode display pixels may display images for a user of device 10. Active display region 16 may be surrounded by an inactive region such as inactive region 18. Inactive region 18 may have the shape of a rectangular ring (as an example). To prevent a user from viewing internal device structures under inactive region 18, the underside of the cover layer for display 14 may be coated with an opaque masking layer. The opaque masking layer may be formed from a layer of ink (e.g., black or white ink), a layer of plastic, or other suitable opaque masking material.

Device 10 may include input-output ports, buttons, sensors, status indicator lights, speakers, microphones, and other input-output components. As shown in FIG. 1, for example, device 10 may include one or more openings in inactive region 18 of display 14 to accommodate buttons such as button 20 and may include one or more openings such as speaker port opening 22 to accommodate audio components.

Device 10 may include one or more optical components. For example, device 10 may include a light sensor such as visible light sensor that makes measurements on the level of ambient light in the vicinity of device 10. This type of sensor, which is sometimes referred to as an ambient light sensor, may be used in making adjustments to screen brightness or other device functions. For example, in response to detection of an increase in the ambient light level, control circuitry within device 10 may increase screen brightness for display 14 to help ensure that the screen remains visible in bright light. The optical components may also include a light-based proximity sensor that emits infrared light and measures how much of the infrared light is reflected by adjacent external objects. In the absence of reflected infrared light, control circuitry in device 10 can conclude that no external objects are in the vicinity of device 10. In the presence of reflected light, the control circuitry in device 10 can conclude that an external object such as a user's head or other body part is in the vicinity of device 10. Proximity sensor signals may be used, for example, to control touch screen functionality (e.g., to inhibit touch input when the proximity sensor detects that device 10 is being held against a user's face so that the user can use speaker port 22 as an ear speaker in connection with a voice telephone call).

Optical components such as optical components associated with an ambient light sensor may be mounted in the vicinity of regions such a region 24 of FIG. 1. Optical components associated with an infrared proximity sensor may be located in the vicinity of regions such as region 26 of FIG. 1. Regions such a regions 24 and 26 may be formed in part of inactive region 18 of display 14 or may be located elsewhere on device 10 (e.g., on a rear planar housing member such as a rear glass plate, on other housing structures, etc.).

The optical components in device 10 may include an ambient light sensor, a proximity sensor, or other optical equipment. Arrangements in which device 10 includes an ambient light sensor and proximity sensor are sometimes described herein as an example. This is, however, merely illustrative. Any suitable optical components may be included in device 10 and may be mounted under any suitable portion of display 14 or other location within housing 12 if desired.

Figure 2:
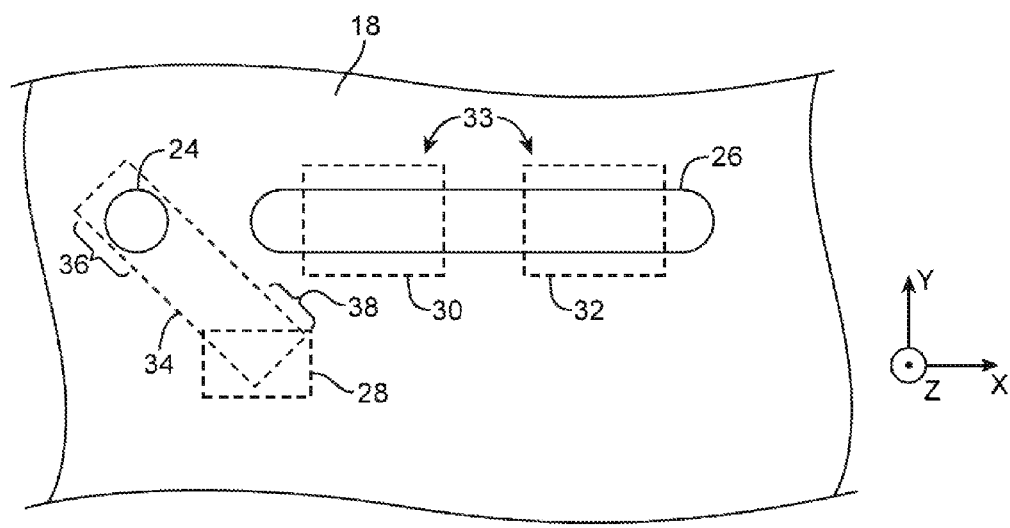
FIG. 2 is a top view of a portion of an electronic device showing where ambient light sensor and proximity sensor windows and sensor structures may be formed in accordance with an embodiment of the present invention.

A top view of a portion of device 10 in the vicinity of regions 24 and 26 is shown in FIG. 2. Regions 24 and 26 may correspond to sensor windows through which sensor light may pass during sensor operation. For example, region 24 may correspond to an ambient light sensor window and region 26 may correspond to a proximity sensor window.

A proximity sensor such as proximity sensor 33 may be formed from proximity sensor light transmitter 32 and proximity sensor light detector 30. Transmitter 32 and detector 30 may be mounted under proximity sensor window 26 or other suitable portion of display 14. Proximity sensor transmitter 32 may be a light-emitting diode such as an infrared light-emitting diode or other suitable light source. Proximity sensor detector 30 may be an infrared photodetector. Proximity sensor window 26 may be sufficiently transparent to infrared light to allow light from transmitter 32 to pass from inside of device 10 through window 26 to an external object such as a user's body. Proximity sensor window 26 may also be sufficiently transparent to infrared light to allow reflected infrared light from the user's body or other external object to pass through window 26 into sensor 30. Proximity sensor window 26 may be sufficiently opaque at visible light wavelengths to hide internal device components from view and to present an attractive appearance to a user of device 10.

During operation of ambient light sensor 28, light may pass through ambient light sensor window 24 to be detected by ambient light sensor 28. To help route ambient light to ambient light sensor 28 in a configuration of the type shown in FIG. 2 in which ambient light sensor 28 is laterally offset from ambient light sensor window 24, light guide structures such as light guide 34 may be provided. Light guide 34 may have a first end such as end 36 (i.e., a light entrance) that overlaps and is aligned with ambient light sensor window 24 and may have a second end such as end 38 (i.e., a light exit) that overlaps and is aligned with ambient light sensor 28.

The use of light guides such as light guide 34 may allow optical components such as ambient light sensor 28 to be laterally shifted (i.e., offset within the plane of device 10 in lateral dimensions X and Y) within the housing of device 10 so that ambient light sensor 28 is not aligned with region 24. This provides flexibility in mounting components within the interior of device 10 under region 24.

During operation of the ambient light sensor, visible light passes through light sensor window 24, is guided along the interior of device 10 using light guide 34, and is provided to light sensor 28. In the example of FIG. 2, light guide structure 34 has been used to route light within device 10 so that window 24 need only overlap end 36 of light guide structure 34 and need not overlap ambient light sensor 28. If desired, this type of arrangement may be used to route light to other light sensors. For example, a light guide such as light guide 34 may be used to route light from a window such as window 26 to proximity sensor infrared detector 30 (as an example).

Figure 3:
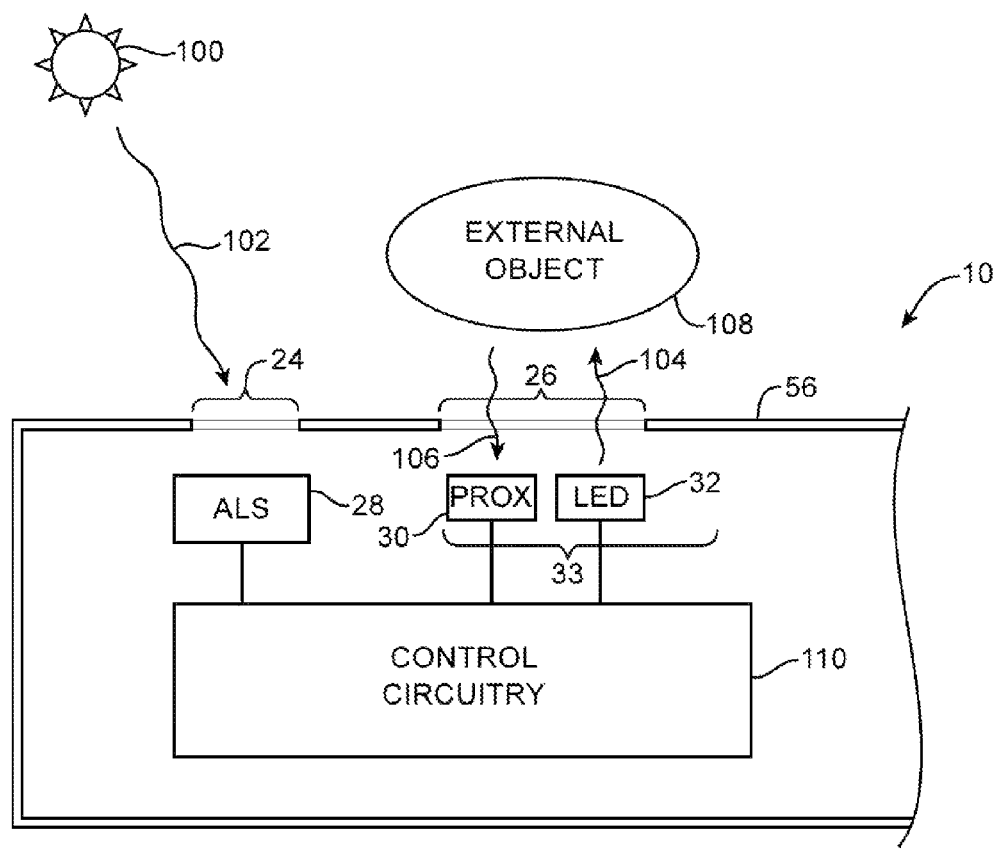
FIG. 3 is a cross-sectional side view of an illustrative sensor configuration in an electronic device in accordance with an embodiment of the present invention.

FIG. 3 is a cross-sectional side view of a portion of device 10 showing how light sensor equipment such as proximity sensor 33 and ambient light sensor 28 may operate. Proximity sensor 33 may include infrared light-emitting diode 32 and infrared light detector 30. Light-emitting diode 32 may emit infrared light 104, which may be reflected off of nearby external objects such as external object 108. Reflected infrared light 106 may be detected using proximity sensor light detector 30. The window material in proximity sensor window 26 of display cover layer 56 may be configured to pass infrared light 104 and 106 without excessive attenuation.

Ambient light sensor 28 may receive ambient light 102 such as light from the sun or other external light source 100 through ambient light sensor window 24. Ambient light sensor 28 may be used to measure the amount of visible light in the environment in real time.

Control circuitry 110 may be used to control the operation of proximity sensor 22 and ambient light sensor 28 (e.g., to take suitable actions when external objects are detected within the vicinity of device 10, to take suitable actions based on the intensity of ambient light, etc.).

Figure 4:
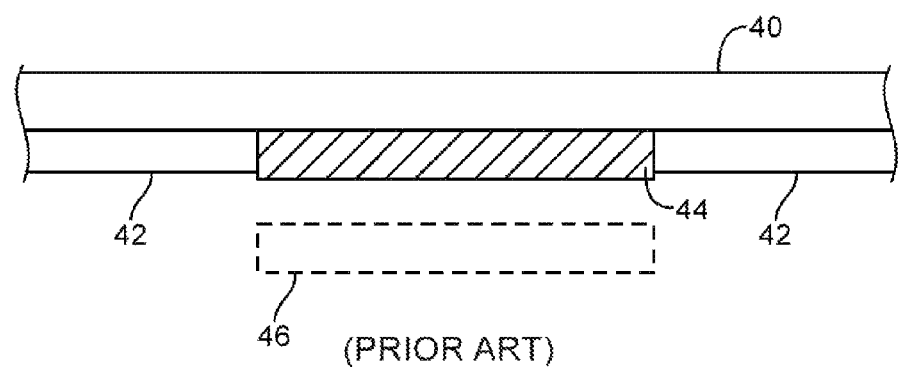
FIG. 4 is a cross-sectional side view of a conventional light sensor window formed in a black masking layer on the underside of a display cover layer.

In conventional arrangements, light sensors are obscured from view using layers of ink. FIG. 4 is a cross-sectional side view of a light sensor arrangement in a conventional cellular telephone. Cover glass 40 is coated on its underside with patterned black ink layer 42. Ink 42 is opaque and is therefore unsuitable for allowing light to pass for a sensor. Accordingly, black infrared ink 44 is deposited in an opening in ink 42. This allows sensors 46 (an ambient light sensor and a proximity sensor) to operate, while at least somewhat hiding sensors 46 from view.

Figure 5:
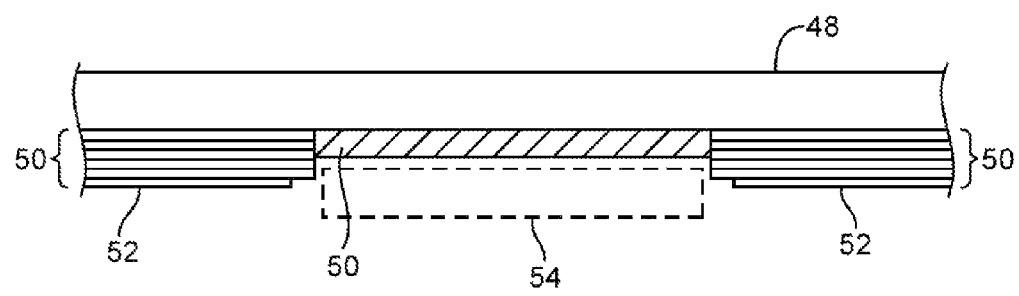
FIG. 5 is a cross-sectional side view of a conventional light sensor window formed within a layer of white ink on the underside of a display cover layer.

A conventional configuration of the type shown in FIG. 5 has been used in cellular telephones with white opaque masking layers. As shown in FIG. 5, display cover glass 48 has a window that covers sensors 54 (an ambient light sensor and a proximity sensor). The underside of display cover glass 48 is covered with five layers of white ink 50 and a coating of gray ink 52. The light sensor window in white ink layers 50 is filled with black infrared ink layer 50.

The use of infrared-transparent ink 44 in FIG. 4 and infrared-transparent ink 50 in FIG. 5 can reduce ambient light sensor performance, because infrared ink tends to significantly diminish the visible light intensity that reaches the ambient light sensor. The use of a single window that covers both ambient light and proximity sensors in conventional configurations makes it challenging to increase visible light transmission in the infrared ink without making the infrared ink too thin and aesthetically unappealing.

To maintain desirable device aesthetics, ambient light sensor window 24 can be formed from an opening that is completely or at least partly separate from proximity sensor window 26, as shown in FIG. 2. Because window 26 need only be used for the ambient light sensor, its size can be reduced, thereby minimizing the visibility of window 26, even when adjusting the window configuration to enhance visible light transmission. The material that is used in the ambient light sensor window can also be optimized independently from the material that is used in the proximity sensor window.

Visible light transmission for window 24 may be enhanced by forming patterned openings in one or more of the layers of the window material and/or by formulating the window material to transmit more visible light (relative to infrared light) than in the infrared ink used for proximity sensor window 26.

Figure 6:
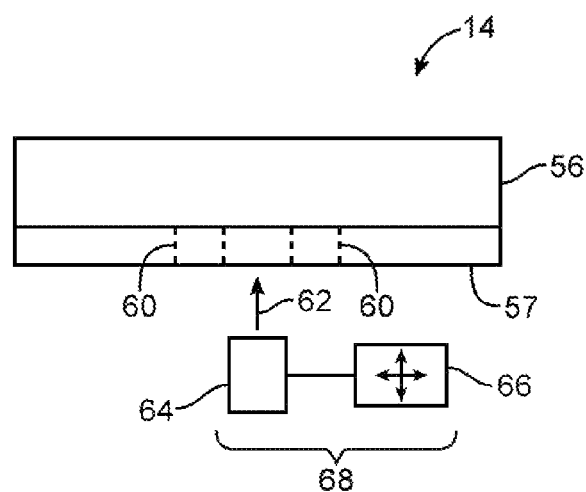
FIG. 6 is a diagram showing how laser processing equipment may be used in forming light sensor window structures for an electronic device in accordance with an embodiment of the present invention.

As shown in FIG. 6, display 14 may include display cover layer 56. An opaque masking layer (not shown in FIG. 6) may be placed around the inactive peripheral portion of the display (see, e.g., inactive peripheral region 18 of display 14 in FIG. 1). In window regions such as ambient light sensor region 24, material 57 may be deposited. Material 57 may be, for example, a window material such as ink. The ink may be deposited in one or more layers (e.g. one or more layers of 6-9 microns in thickness). The ink may be formulated to pass a desired amount of visible light to an underlying ambient light sensor. Visible light transmission may also be controlled by forming a pattern of holes (openings) 60 in one or more of the ink layers.

Equipment such as laser patterning tool 68 may be used in forming holes 60. Laser patterning tool 68 may include a laser such as laser 64. Computer-controlled positioner 66 may be used to control the position of laser 64 and thereby control the position of laser beam 62. By controlling the intensity and position of laser beam 62, laser processing tool 68 may be used to form a desired pattern of holes 60 in material 57.

Figure 7:
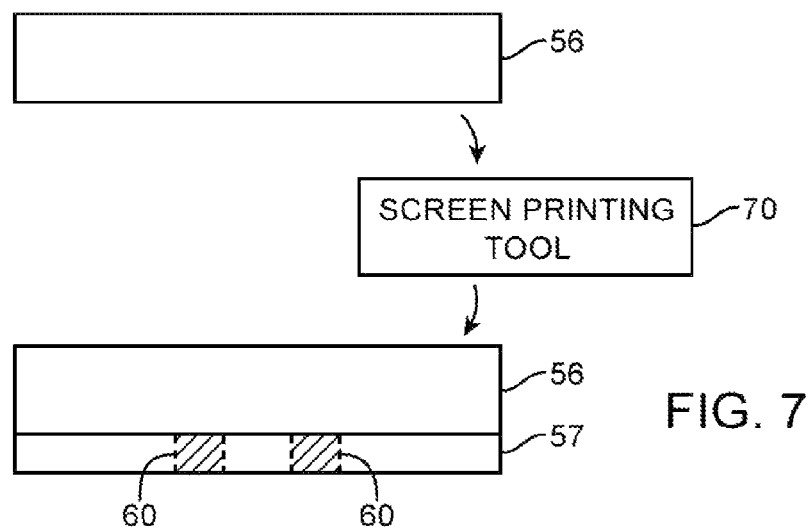
FIG. 7 is a diagram showing how screen printing equipment may be used in forming light sensor window structures for an electronic device in accordance with an embodiment of the present invention.

If desired, holes 60 may be formed material 57 using screen printing. As shown in FIG. 7, for example, holes 60 in material 57 may be formed using screen printing tool 70 (e.g., using a patterned screen to print material around a desired pattern of holes 60). Other types of material patterning techniques may also be used in forming a desired pattern of holes in window material 57 (e.g., ink-jet printing, pad printing, dripping, painting, spraying, machining, etc.). The examples of FIGS. 6 and 7 are merely illustrative.

Figure 8:
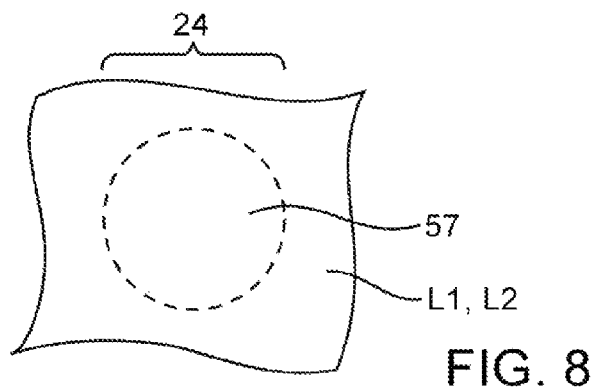
FIG. 8 is a top view of a solid portion of a light sensor window structure in an electronic device in accordance with an embodiment of the present invention.
Figure 9:
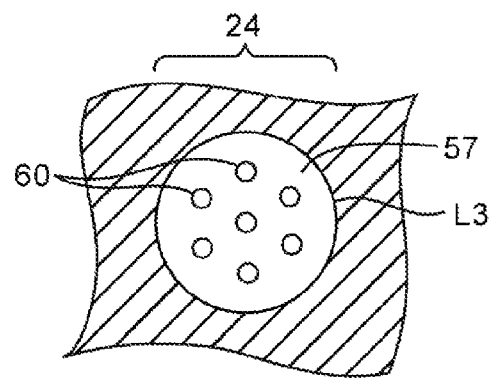
FIG. 9 is a top view of a light sensor window structure with openings of the type that may be formed in alignment with the solid structures of FIG. 8 in accordance with an embodiment of the present invention.
Figure 10:
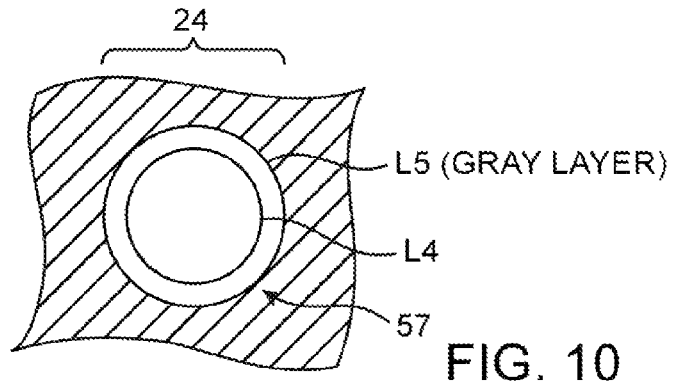
FIG. 10 is a top view of light sensor window opening structures that may be formed in alignment with the patterned structures of FIG. 9 in accordance with an embodiment of the present invention.
Figure 11:
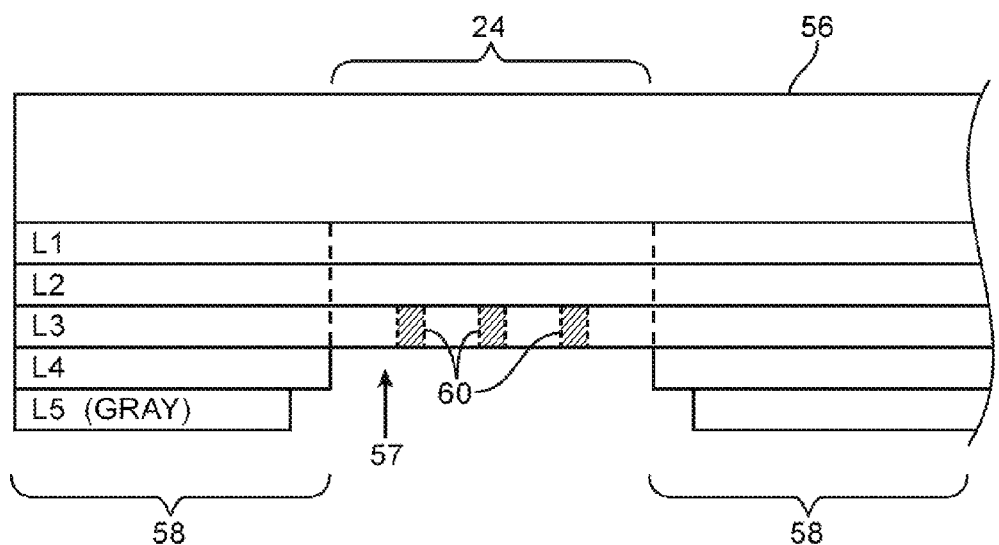
FIG. 11 is a cross-sectional side view of an illustrative light sensor window structure that may be formed using window structure patterns of the type shown in FIGS. 8, 9, and 10 in accordance with an embodiment of the present invention.

Using window material patterning techniques of the type shown in FIGS. 6 and 7 or other suitable techniques, one or more layers of material in a window (e.g., ambient light sensor window 24) may be formed. In the example of FIGS. 8, 9, and 10, a five-layer window structure has been formed in which the first four layers of the underside of cover layer 56 have been coated with white ink. Each layer of white ink may have a thickness of about 6-9 microns (as an example). The first two layers may be solid (as shown in FIG. 8). The next layer (layer L3 in the FIG. 9 example), may have a pattern of holes 60. Holes 60 may allow visible light to pass and may therefore help improve the visible light transmission for ambient light sensor window 24. Holes 60 may be formed by screen printing or other suitable techniques and may have diameters of 0.3 mm, 0.2 mm to 0.4 mm, etc. (as examples). The fourth layer on the underside of the cover layer may have an opening such as opening L4 in FIG. 10 that is devoid of ink. A fifth ink layer may be formed on the underside of the cover layer on top of the fourth layer. As shown by opening L5 in the example of FIG. 10, the fifth layer of ink may have an opening that is larger than the opening in the fourth layer of ink and that is concentric (overlapping) with the opening in the fourth layer of ink. The fifth layer of ink may be, for example, a layer of gray ink. An ambient light sensor window structure formed using layers of the type shown in FIGS. 8, 9, and 10 is shown in FIG. 11 as ambient light sensor window 24. In regions 58, the layers of ink have been used to form an opaque masking layer.

Figure 12:
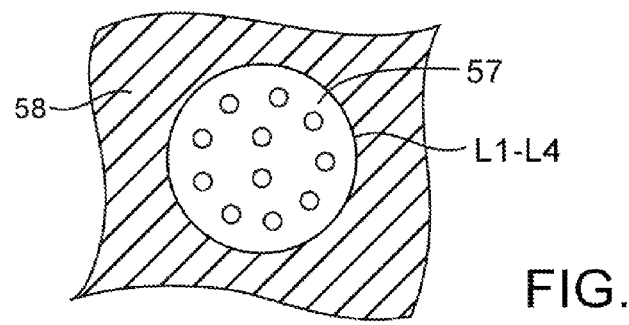
FIG. 12 is a top view of a light sensor window structure with patterned openings in an electronic device in accordance with an embodiment of the present invention.
Figure 13:
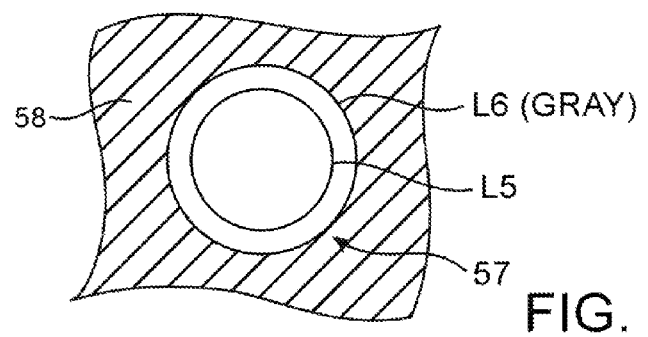
FIG. 13 is a top view of a light sensor window structure that may be formed in alignment with the patterned structures of FIG. 12 in accordance with an embodiment of the present invention.

In the illustrative ambient light sensor window configuration of FIGS. 12 and 13, the first four layers of ink on the underside of cover layer 56 have been formed from layers of laser-patterned white ink. As shown in FIG. 12, each of the first four layers of ink L1, L2, L3, and L4 may contain a matching pattern of laser-drilled holes 60 (e.g., holes with a diameter of about 0.03 to 0.07 mm). The fifth layer of white ink may have an opening (L5) that overlaps the patterns of holes 60. Gray ink layer L6 may have an opening that overlaps the window opening associated with white ink layer L5. An ambient light sensor window structure formed using layers of the type shown in FIGS. 12 and 13 is shown in FIG. 14 as ambient light sensor window 24.

Figure 14:
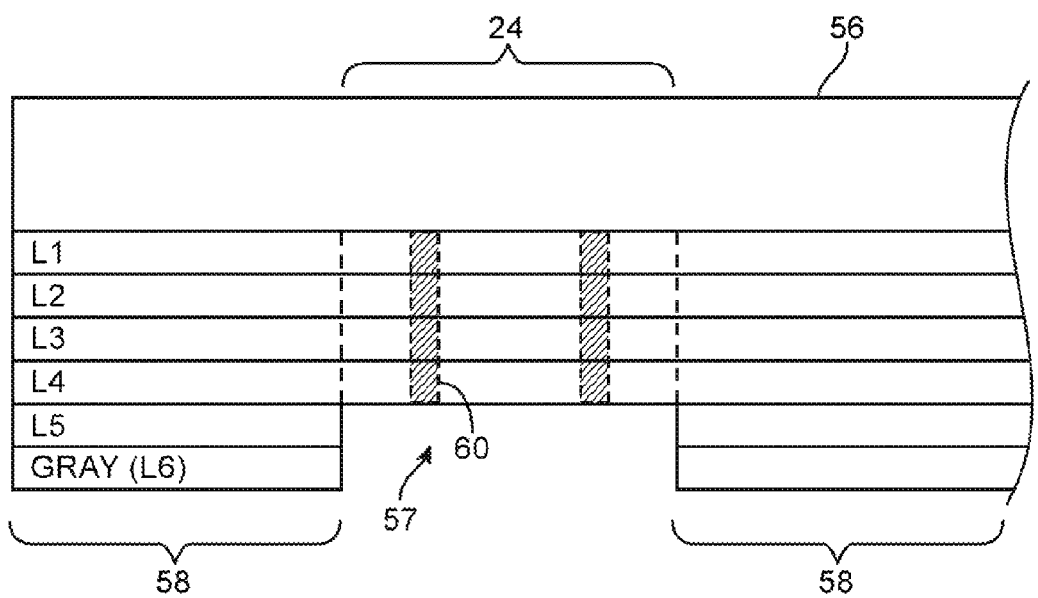
FIG. 14 is a cross-sectional side view of an illustrative light sensor window structure that may be formed using window structure patterns of the type shown in FIGS. 12 and 13 in accordance with an embodiment of the present invention.

The diameters of ambient light sensor windows 24 of FIGS. 11 and 14 may be, for example, about 1.1 to 1.3 mm (as an example). Thinner or thicker layers of ink and inks of different colors may be used if desired. When white ink is used in the ambient light sensor window, the ambient light sensor window may appear white, even though sufficient visible light is passed to ambient light sensor 28. When both the ambient light sensor window and surrounding masking layer on the underside of cover layer 56 are white, the ambient light sensor window may not be visually noticeable by the user, enhancing device aesthetics.

Figure 15:
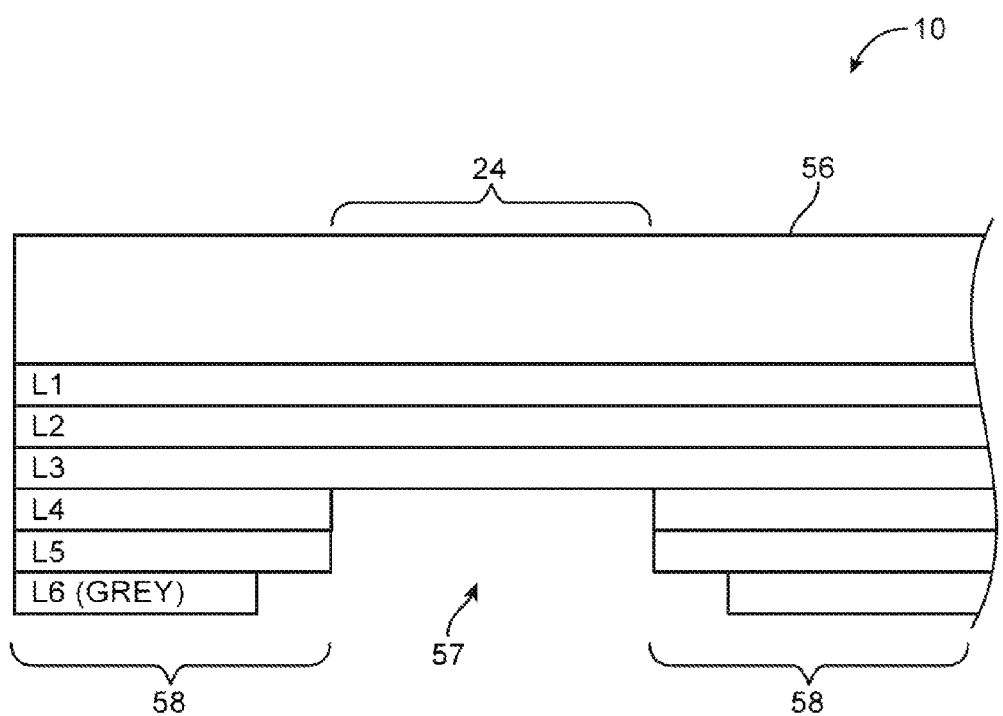
FIG. 15 is a cross-sectional side view of an illustrative window structure that may be used in an electronic device in accordance with an embodiment of the present invention.
Figure 16:
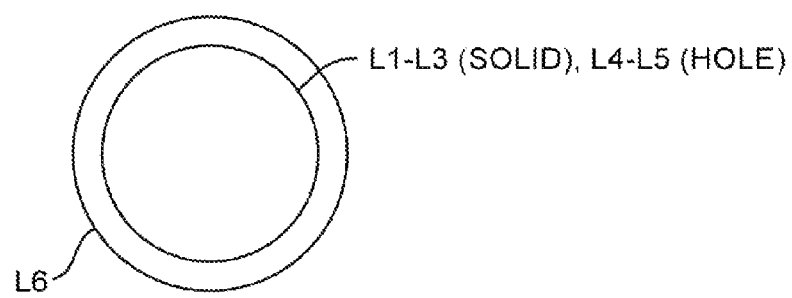
FIG. 16 is a top view of the light sensor window structures of FIG. 15 in accordance with an embodiment of the present invention.

Another configuration that may be used for ambient light sensor window 24 is shown in FIGS. 15 and 16. As shown in FIG. 15, ambient light sensor window 24 may be formed from window material 57 such as three layers of solid white ink (layers L1, L2, and L3). Openings in layers L4 and L5 may be about 1.1 to 1.3 mm in diameter and may form ambient light sensor window 24. Gray layer opening L6 may overlap the openings in layers L4 and L5 and may have a larger diameter (e.g., 1.15 to 1.35 mm in diameter as an example). The layers of ink may be white, gray, or other suitable colors and may have thicknesses of 6 to 9 microns or other suitable thicknesses. The window opening for ambient light sensor window 24 may be circular, oval, rectangular, or other suitable shapes. The portions of material surrounding sensor window 24 may form opaque masking layer 58 for inactive region 18.

Figure 17:
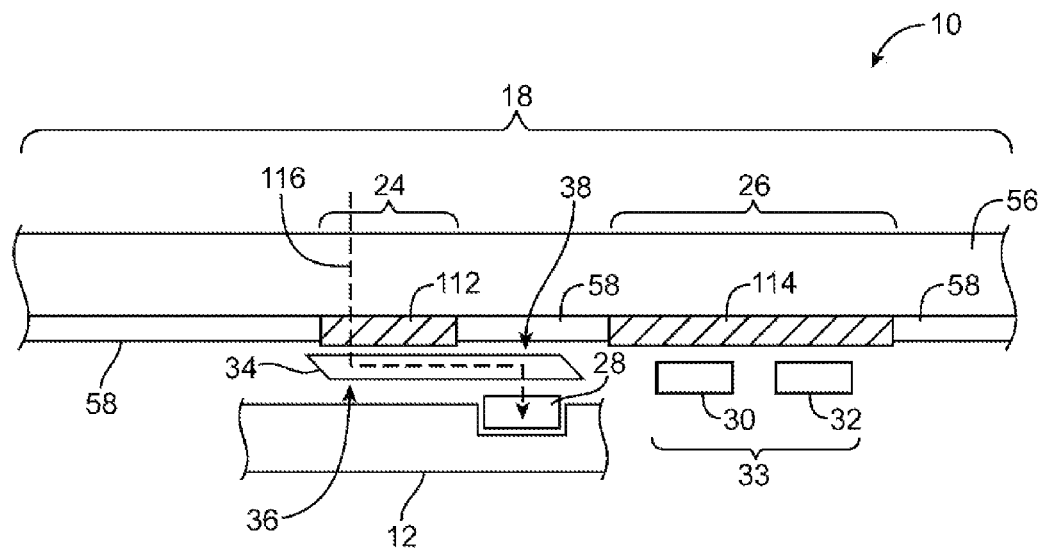
FIG. 17 is a cross-sectional side view of a portion of an electronic device having light sensor structures of the type shown in FIG. 2 formed under light sensor windows that have each been coated with a single layer of ink in accordance with an embodiment of the present invention.

FIG. 17 is a cross-sectional side view of a portion of device 10 under inactive region 18. With the configuration of FIG. 17, layer 58 on the underside of cover layer 56 may be formed from an opaque masking material such as black ink (as an example). Proximity sensor 33 may include infrared light-emitting diode 32 and infrared light sensor 30 under proximity sensor window 26. Proximity sensor window 26 may be formed by incorporating a layer of material such as material 114 into window 26 (i.e., into an opening in opaque masking layer 58). Material 114 may be a material such as black infrared ink that is opaque at visible wavelengths and transparent at infrared wavelengths. Ambient light sensor 28 may be mounted within internal support structures in device 10 (shown as housing 12) under end 38 of light guide structure 34. Ambient light sensor window 24 may be formed from a layer of material 112 that is suitable for allowing at least some visible light 116 to pass into ambient light sensor 28 via light guide structure 34. Material 112 in ambient light sensor window 24 may be, for example, a black-colored ink that has more visible light transmission relative to infrared light transmission than infrared ink 114.

Figure 18:
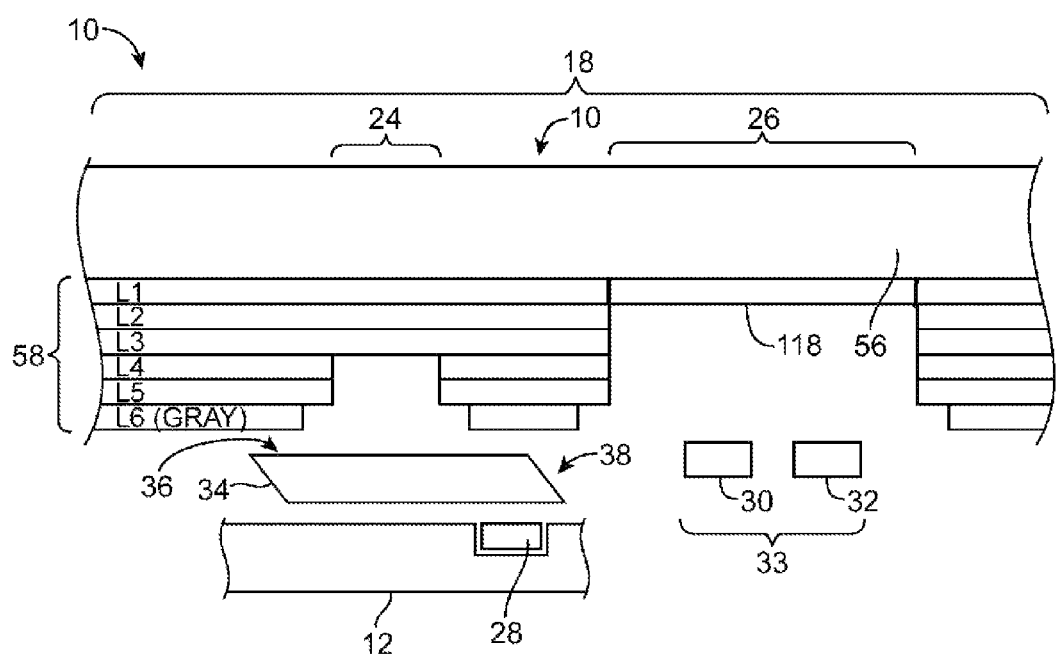
FIG. 18 is a cross-sectional side view of a portion of an electronic device having light sensor structures of the type shown in FIG. 2 formed under light sensor windows such as an ambient light sensor window of the type shown in FIGS. 15 and 16 in accordance with an embodiment of the present invention.

FIG. 18 is a cross-sectional side view of a portion of device 10 under inactive region 18 in a device that has a white coating under cover layer 56. With the FIG. 18 arrangement, the underside of cover layer 56 may be formed from an opaque masking material such as white ink and optionally a layer of gray ink (as an example). In the regions of cover layer 56 that are not used in forming ambient light sensor window 24 and proximity sensor window 26, opaque masking layer 58 may, for example, be formed from multiple layers of ink such as five white ink layers (L1, L2, L3, L4, and L5) each having a thickness of about 6-9 microns or other suitable thickness. As described in connection with the example of FIG. 5, the sixth layer of material that is formed on the underside of cover layer 56 to form opaque masking layer 58 may be gray ink. Gray ink may be more opaque than white ink for a given thickness and may therefore help ensure that opaque masking layer 58 is opaque. Different configurations (e.g., inks or other materials of different colors and/or thicknesses) may be used in forming opaque masking layer 58 if desired. The arrangement of FIG. 18 is merely illustrative.

As shown in FIG. 18, proximity sensor 33 may include infrared light-emitting diode 32 and infrared light sensor 30 under proximity sensor window 26. Proximity sensor window 26 may be formed by incorporating a layer of material such as material 118 into window 26 (i.e., into an opening in opaque masking layer 58). Material 118 may be a material such as infrared ink that is opaque at visible wavelengths and transparent at infrared wavelengths. The color of ink 118 may be black or other suitable colors. As with the configuration of FIG. 17, ambient light sensor 28 may be mounted within internal support structures in device 10 (shown as housing 12) under end 38 of light guide structure 34.

In the FIG. 18 arrangement, ambient light sensor window 24 has been formed from a layer of material that is an extension of portions of layer 58. In particular, the layer of material in window 24 may be made up of the first three white ink layers (L1, L2, and L3) that are used in forming opaque masking layer 58. Layers L1, L2, and L3 are suitable for allowing at least some visible light to pass into ambient light sensor 28 via light guide structure 34. As light passes through layers L1, L2, and L3 in ambient light sensor window 24, the light is diffused (e.g., scattered) by the white ink, which may help reduce unwanted directional sensitivity for ambient light sensor 28.

In the example of FIG. 18, white ink layers L1, L2, and L3 are solid and therefore devoid of openings 60. If desired, patterns of holes 60 may be incorporated into one or more of the layers of material in ambient light sensor window 24, as described in connection with FIGS. 8-14. The use of holes 60 may help reduce unwanted directional sensitivity for ambient light sensor 28, as light tends to reflect off of the interior of the holes and diffuse before reaching ambient light sensor 28.

By forming ambient light sensor window 24 and proximity sensor window 26 from two potentially discrete openings in opaque masking layer 58 and by filling these openings with two potentially different types of materials (which may or may not the same materials as some of the materials in masking layer 58), visible light transmission for ambient light sensor 28 may be enhanced while retaining a satisfactory appearance for windows 24 and 26 when viewed against the background of opaque masking layer 58 from the exterior of device 10.

The materials used in opaque masking layer 58, ambient light sensor window 24, and proximity sensor window 26 may, in general, have any suitable number of layers, any suitable types of material, any suitable colors, and any suitable light transmittance characteristics. Material 112 in ambient light sensor window 24 of FIG. 17 may be, for example, a black-colored ink that has more visible light transmission relative to infrared transmission than infrared ink 114. The material associated with the L1, L2, and L3 layers of ambient light sensor window 24 of FIG. 18 may likewise exhibit more visible light transmission relative to infrared transmission than infrared ink 118. Infrared ink 118 may be, for example, black infrared ink.

Figure 19:
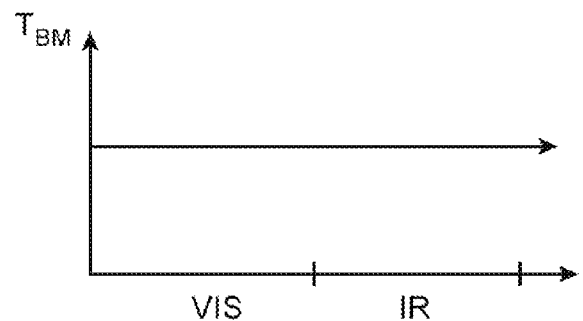
FIG. 19 is a graph showing the transmittance of an illustrative opaque masking layer such as a black masking layer that may be formed on the underside of a display cover layer in accordance with an embodiment of the present invention.
Figure 20:
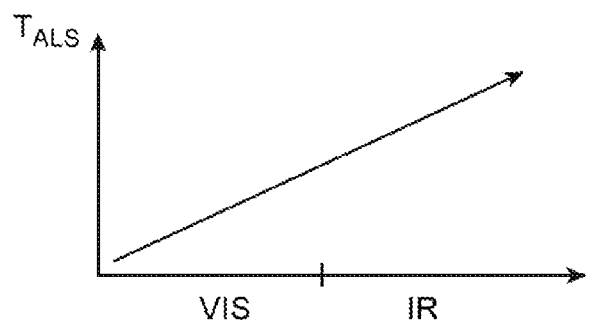
FIG. 20 is a graph showing the transmittance of an illustrative ambient light sensor window material that may be formed on the underside of a display cover layer in accordance with an embodiment of the present invention.
Figure 21:
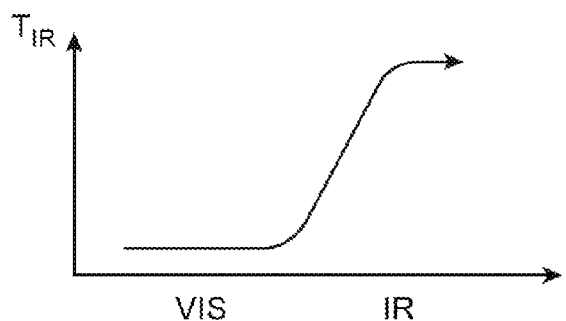
FIG. 21 is a graph showing the transmittance of an illustrative infrared light sensor window material that may be formed on the underside of a display cover layer in accordance with an embodiment of the present invention.

FIGS. 19, 20, and 21 are graphs of illustrative light transmittance characteristics that may be associated with the materials on the underside of cover layer 56. The relatively flat transmittance curve of FIG. 19 (at least in the visible region VIS) may be associated with opaque masking material that is used in inactive region 18 of device 10 surrounding ambient light sensor window 24 and proximity sensor window 26. As shown in FIG. 19, the opaque masking material may have a transmittance in the visible light portion VIS of the spectrum that is relatively equal to its transmittance in the infrared light portion IR of the spectrum (as an example). Other types of opaque masking material may be used if desired. The color of the opaque masking material may be white, black, or other suitable colors. In forming a black opaque mask for inactive region 18, a single layer or a relatively small number of layers of material may be used (e.g., one or more layers of black masking layer ink). In forming a white opaque mask for inactive region 18, multiple layers of white ink (L1, L2, etc.) and an optional layer of gray ink may be used (e.g., multiple layers each of which has a thickness of 6-9 microns or other suitable thickness). White opaque masks may also be formed using a single thicker layer of white ink or other white masking material. If desired, opaque masking layer materials of other colors (e.g., gray, blue, silver, etc.) may be used. The use of black opaque masking layers in region 18 and the use of white opaque masking layers in region 18 is merely illustrative.

FIG. 20 shows the transmittance that may be associated with an ambient light sensor window material such as a material in ambient light sensor window 24. The material associated with the transmittance curve of FIG. 20 may transmit relatively more visible light than infrared ink, while still retaining sufficient visible light opacity to help hide components under ambient light sensor window 24 from view by a user.

Ambient light sensor window 24 may be formed from one or more layers of ink (as an example). If desired, the same ink or other material may be used in forming portions of the opaque masking layer in inactive region 18 and the ambient light sensor window material in ambient light sensor window 24. For example, five (or more or fewer) layers of ink having a transmittance curve of the type shown in FIG. 19 may be used in forming an opaque masking layer structure for inactive region 18 and two or three (or more or fewer) layers of the same ink may be used in forming ambient light sensor window 24.

In proximity sensor window 26, infrared-transmitting material having a relatively strong infrared transmittance value relative to its visible transmittance value may be used. For example, infrared ink having a transmittance characteristic of the type shown in FIG. 21 may be used in proximity sensor window 26.

In general, window 24 and/or window 26 may be formed using a material having a transmittance characteristic of the type shown in any of FIG. 19, 20, or 21 or other suitable transmittance characteristic.

With an illustrative black masking layer configuration (e.g., in a device with a black housing), ambient light sensor window 24 may be formed using a black ink or other ink that has the transmittance characteristic of FIG. 20, surrounding portions of inactive region 18 may be covered with an opaque masking layer formed from a black ink or other material that has a transmittance characteristic of the type shown in FIG. 19, and proximity sensor window 26 may be formed using an ink or other material such as black infrared ink having a transmittance characteristic of the type shown in FIG. 21.

With an illustrative white masking layer configuration (e.g., in a device with a white housing), ambient light sensor window 24 may be formed using multiple layers of white ink that has a transmittance characteristic of the type shown in FIG. 19 or 20, surrounding portions of inactive region 18 may be covered with an opaque masking layer formed from additional layers of white ink and/or other layers of material such as gray ink that has a transmittance characteristic of the type shown in FIG. 19, and proximity sensor window 26 may be formed using an ink or other material such as black infrared ink having a transmittance characteristic of the type shown in FIG. 21.

Light guide structure 34 may have any suitable shape. For example, light guide structure 34 may have a tubular shape with a circular light entrance at end 36 and a circular light exit at end 38. Light guide structure 34 may have other shapes such as oval cross-sectional shapes, rectangular cross-sectional shapes, cross-sectional shapes with combinations of curved and straight sides, etc.

Figure 22:
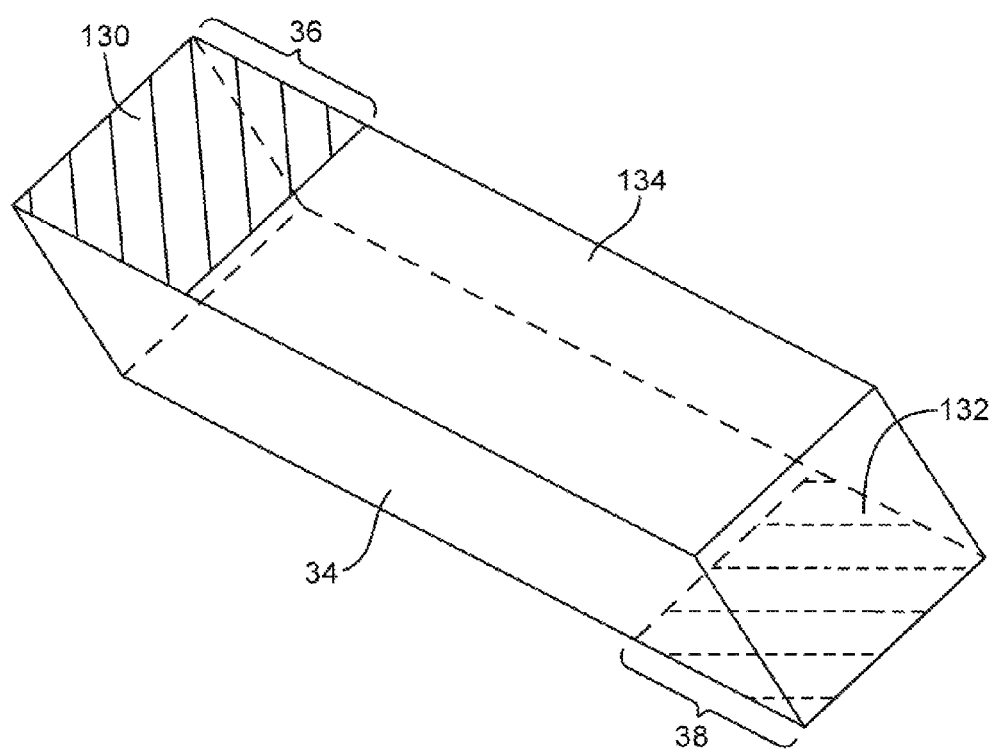
FIG. 22 is a perspective view of an illustrative light guide structure that may be used in guiding light from an ambient light sensor window on the underside of a display cover layer to an ambient light sensor in accordance with an embodiment of the present invention.

FIG. 22 is a perspective view of an illustrative configuration that may be used for light guide structure 34 in which light guide structure 34 has a rectangular box shape with angled ends. The interior of light guide structure 34 may be formed from a transparent material such as clear glass, clear plastic, etc. The surface of light guide structure 34 may be coated with a reflective material such as metal (e.g., aluminum, etc.). Openings in the reflective coating layer on light guide structure 34 may be formed at ends 36 and 38. As shown in FIG. 22, the opening in reflective layer 134 at end 36 may form a light entrance (light entrance port) such as rectangular light entrance port 130. The opening in reflective layer 134 at end 38 may form a light exit (light exit port) such as rectangular light exit port 132. Entrance and exit ports of other shapes (e.g., circles, ovals, etc.) may be used if desired.

Figure 23:
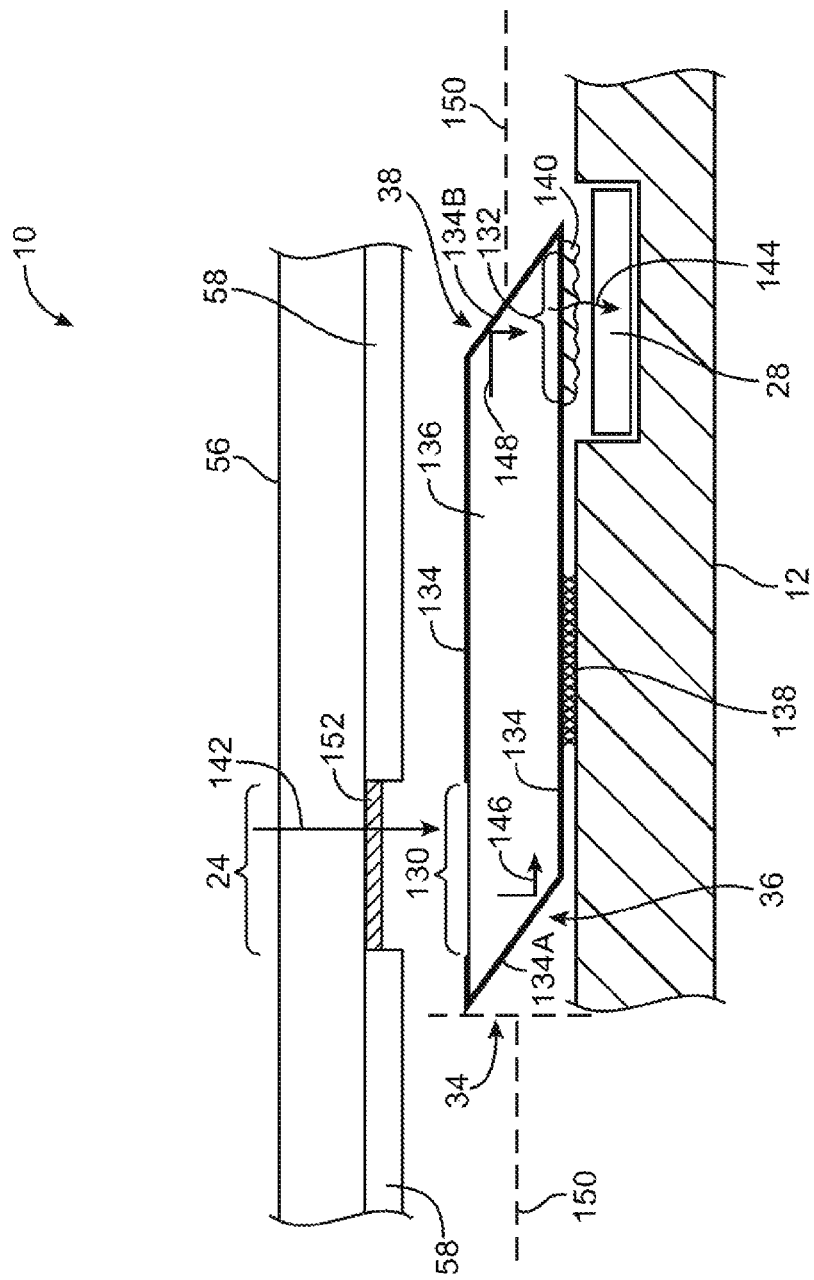
FIG. 23 is a cross-sectional side view of a portion of an electronic device showing how a light guide structure such as the light guide structure of FIG. 22 may be used in guiding light from an ambient light sensor window on the underside of a display cover layer to an ambient light sensor in accordance with an embodiment of the present invention.

FIG. 23 is a cross-sectional side view of a portion of electronic device 10 showing how a light guide structure such as light guide structure 34 of FIG. 22 may be used in routing light from ambient light sensor window 24 to ambient light sensor 28. As shown in FIG. 23, light guide structure 34 may have a transparent core structure such as core structure 136 (e.g., a transparent plastic or glass member). Reflective layer 134 may be used to coat the exterior of core structure 136. As light travels within core structure 136, the reflective material of layer 134 may reflect the light and may help contain the light within core structure 136. Angled surface 134A at end 36 may help reflect light 146 along the interior of core structure 136 parallel to longitudinal axis 150. Angled surface 134B at end 38 may help reflect light 148 that is traveling parallel to axis 150 downwards toward ambient light sensor 28.

Adhesive 138 or other fastening mechanisms (e.g., screws, snaps, etc.) may be used in attaching light guide structure 34 to interior portions of device 10 (e.g., to support structures 12).

When device 10 is used in an environment that contains light, light 142 (e.g., visible light) may penetrate through ambient light sensor window material 152 and may enter light guide core structure 136 through light guide entrance window 130 in coating 134. The light that has entered light guide structure 34 may be reflected within core material 136 using reflective coating 134 and angled end surfaces 134A and 134B until the light exits through light guide exit window 132 in coating 134. An optional diffuser structure such as diffuser 140 may be used to help diffuse light 144 as light 144 exits light guide structure 34. Diffuser structure 140 may be formed form a textured clear structure (e.g., textured polymer) or other suitable structure that scatters light 144 before light 144 reaches ambient light sensor 28, thereby helping to reduce undesired directionality in the performance of ambient light sensor 28.

The foregoing is merely illustrative of the principles of this invention and various modifications can be made by those skilled in the art without departing from the scope and spirit of the invention.

What is claimed is:

1. An electronic device, comprising:
an ambient light sensor window;
an ambient light sensor configured to receive light through the ambient light sensor window;
a proximity sensor window;
a proximity sensor configured to receive light through the proximity sensor window; and
a light guide structure, wherein the ambient light sensor is laterally offset from the ambient light sensor window and wherein the light guide structure conveys light received through the ambient light sensor window to the laterally-offset ambient light sensor.

2. The electronic device defined in claim 1 wherein the light guide structure has a transparent core coated with a reflective layer.

3. The electronic device defined in claim 2 wherein the light guide structure has angled surfaces at opposing first and second ends, a light entrance in the reflective layer at the first end, and a light exit in the reflective layer at the second end.

4. The electronic device defined in claim 3 further comprising a light diffuser structure on the light guide structure that is interposed between the light exit and the ambient light sensor.

5. An electronic device, comprising:
an ambient light sensor window;
an ambient light sensor configured to receive light through the ambient light sensor window;
a proximity sensor window;
a proximity sensor configured to receive light through the proximity sensor window;
a display; and
a cover layer on the display, wherein at least part of an interior surface of the cover layer is coated with an opaque masking material, and wherein the ambient light sensor window and the proximity sensor window are formed from different respective regions in the opaque masking layer.

6. The electronic device defined in claim 5 wherein the opaque masking material has an opening for the proximity sensor window and wherein the electronic device further comprises infrared-transparent ink in the opening.

7. The electronic device defined in claim 6 wherein the ambient light sensor window is filled with an ambient light sensor window material that is different than the infrared-transparent ink and wherein the ambient light sensor window material transmits more visible light relative to infrared light than the infrared-transparent ink.

8. The electronic device defined in claim 7 wherein the ambient light sensor window material comprises black ink and wherein the infrared-transparent ink comprises black infrared-transparent ink.

9. The electronic device defined in claim 6 wherein the opaque masking material is formed from a plurality of layers of white ink and wherein the ambient light sensor window is filled with at least one of the layers of the white ink.

10. The electronic device defined in claim 6 wherein the ambient light sensor window comprises a layer with a plurality of holes.

11. The electronic device defined in claim 10 wherein the holes comprise screen printed holes in the layer.

12. The electronic device defined in claim 11 wherein the opaque masking material comprises white material, wherein the layer is formed from the white material, and wherein the screen printed holes comprise holes printed in the white material.

13. The electronic device defined in claim 10 wherein the holes comprise laser-drilled holes in the layer.

14. The electronic device defined in claim 13 wherein the opaque masking material comprises white material, wherein the layer is formed from the white material, and wherein the laser-drilled holes comprise holes drilled in the white material.

15. An electronic device, comprising:
a display having a display cover layer;
an ambient light sensor window in a first region of the display cover layer;

an ambient light sensor configured to receive light through the ambient light sensor window;
a proximity sensor window in a second region of the display cover layer; and
a proximity sensor configured to receive light through the proximity sensor window, wherein the ambient light sensor window comprises an ambient light sensor window material and wherein the proximity sensor contains a proximity sensor window material that is different than the ambient light sensor window material.

16. The electronic device defined in claim 15 wherein the proximity sensor comprises an infrared light source and an infrared light detector and wherein the proximity sensor window material comprises infrared ink.

17. The electronic device defined in claim 16 wherein the infrared ink has a transmission characteristic and wherein the ambient light sensor material comprises ambient light sensor ink having a transmission characteristic that is different than the transmission characteristic of the infrared ink.

18. Apparatus, comprising:
a display cover layer that is coated with an opaque masking layer, wherein the opaque masking layer has at least first and second openings;
an ambient light sensor that receives visible light through material in the first opening; and
a proximity sensor that transmits and receives infrared light through material in the second opening, wherein the material in the second opening passes more infrared light relative to visible light than the material in the first opening.

19. The apparatus defined in claim 18 further comprising a light guide structure that guides light from the first opening to the ambient light sensor.

20. An electronic device, comprising:
a display;
a cover layer on the display, wherein at least part of an interior surface of the cover layer is coated with an opaque masking material and wherein the opaque masking material is formed from a plurality of layers of white ink;
a sensor window in the display cover layer, wherein the sensor window is filled with at least one of the layers of the white ink; and
a sensor configured to receive signals through the sensor window.

21. The electronic device defined in claim 20 wherein the sensor comprises an ambient light sensor.

22. The electronic device defined in claim 20 wherein the sensor comprises a proximity sensor.

23. The electronic device defined in claim 20 wherein the sensor window comprises a first layer filled with white ink and a second layer having holes such that the second layer is only partially filled with white ink.

24. The electronic device defined in claim 23 wherein the second layer is between the first layer and the sensor.

25. The electronic device defined in claim 24 wherein the sensor window comprises a third layer filled with white ink and disposed between the first and second layers.

26. The electronic device defined in claim 23 wherein the opaque masking material is formed from at least first, second, and third layers of white ink, wherein the first and second layers of the opaque masking material respectively correspond to the first and second layers of the second window, wherein the sensor window comprises a third layer devoid of white ink and corresponding to the third layer of the opaque masking material, and wherein the third layer of the sensor window is disposed between the second layer of the sensor window and the sensor.

27. The electronic device defined in claim 20 wherein the sensor window comprises openings in at least two of the layers of white ink.

28. The electronic device defined in claim 20 wherein the opaque masking material comprises a layer of gray ink and wherein the layers of white ink are disposed between the cover layer and the layer of gray ink.

* * * * *